Patented Nov. 24, 1925.

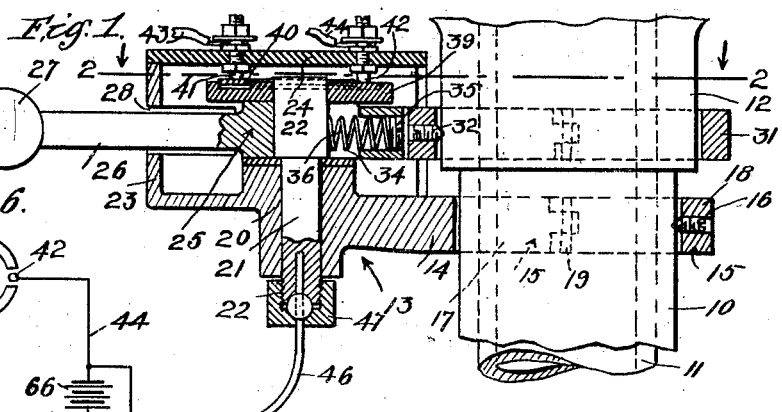

1,562,592

UNITED STATES PATENT OFFICE.

WALTER J. SAVIERS, OF LOS ANGELES, CALIFORNIA.

VEHICLE SIGNAL.

Application filed April 17, 1922. Serial No. 554,043.

*To all whom it may concern:*

Be it known that I, WALTER J. SAVIERS, a citizen of the United States, residing at Los Angeles, in the county of Los Angeles and State of California, have invented new and useful Improvements in Vehicle Signals, of which the following is a specification.

My invention relates to vehicle signals and pertains more particularly to signaling devices adapted to be mounted on an automobile to give warning to the drivers of vehicles approaching either from the front or rear that the operator is about to stop or turn either to the right or left.

My invention further contemplates a novel signaling device and mechanism for operating the same, and means controlled by the steering mechanism of the vehicle for automatically adjusting the signal to a normal position after the vehicle has been righted to a straight ahead position.

Other objects of my invention will be more particularly pointed out in the following description and are illustrated in the accompanying drawings, in which:

Fig. 1 is a side view of a fragment of the steering wheel and post of an automobile showing in section my signal controlling device attached thereto.

Fig. 2 is a plan section of the same taken on the line 2—2 of Fig. 1.

Fig. 3 is a longitudinal section through my improved signaling device.

Fig. 4 is a transverse section through the same taken on the line 4—4 of Fig. 3.

Fig. 5 is a development of the peripheral surface of the signaling device.

Fig. 6 is a wiring diagram showing the manner in which the signal light is controlled.

In carrying out my invention 10 represents the steering post of the steering mechanism of an automobile, 11 the steering wheel stem journaled thereon, 12 the hub of the steering wheel which is secured to said stem, and 13 the signal controlling mechanism adapted to be secured to the steering mechanism.

The controlling mechanism comprises a bracket 14 provided with a ring member 15 adapted to surround the post 10 and to be secured thereto by means of the radially disposed set screws 16, and in order that said ring member may be conveniently placed around the post it is formed in two semiannular sections 17 and 18 secured together by means of the pins 19. By this construction it will be obvious that the bracket 13 may be secured to posts of varying diameter and properly centered therearound.

The section 17 is provided with a boss 20 provided with a centrally disposed bore to form a bearing for a shaft 21 which projects upwardly and downwardly beyond said boss and has a squared upper end 22 which is surrounded by an annular housing wall 23 formed on said bracket, to which is secured a cover 24 preferably formed of insulating material.

Mounted on the square end 22 of the shaft 21 is a hand lever member 25 adapted to rotate said shaft, and provided with the handle 26, having the knob 27 formed thereon, adapted to project through a slot 28 in the wall 23, the end walls 29 and 30 of said slot being adapted to form stops for said lever handle to limit the movement thereof.

To the hub 12 of the steering wheel is secured a ring member 31 which is formed in two sections similar to ring member 15 and is adjusted to the hub by means of the set screws 32, said ring being provided on its outer peripheral surface with the notches 33.

The lever member 25 is provided with a slot 34 into which the square end 22 of shaft 21 projects, and interposed between said shaft and a plug 35 secured in the end of the lever member is a spring 36. By this construction it will be obvious that the shaft 21 will be caused to rotate upon a movement of the lever member and that said lever member may be moved longitudinally with respect thereto.

The inwardly projecting end of the lever member 25 is provided with a pair of tooth members 37 and 38, adapted to normally rest adjacent the peripheral surface of the ring member 31 and at times to be engaged in the notches 33 formed therein.

Mounted on the shaft 21 and adapted to rotate therewith is a disc 39 formed of insulating material and provided with a segmental spring electrical conductor member 40, and secured in the cover 24 are the contact points 41 and 42 which are also adapted to serve as binding posts for the reception of the circuit wires 43 and 44. The contact point 41 is adapted to make contact with the member 43 at all times and the point 42 to make contact therewith upon a movement of the lever member 25 either to the right or left, it normally resting upon the insulating disc as shown in Figs. 1 and 2 of the drawings.

Attached to the lower end of shaft 21 is a flexible shaft which comprises a length of spring wire 46 having secured to its end a ball of soft metal which is clamped to the end of said shaft by means of the cap member 47 which is threaded thereto.

The flexible shaft 46 is adapted to lead to one trunnion 48 of a rotatable signaling device 49, adapted to be mounted on the side of the vehicle, and to be secured thereto in a similar manner in which its opposite end is secured to the shaft 21. By this construction it will be obvious that upon a rotation of shaft 21 the signaling device 49 will be also rotated.

The signaling device 49 comprises a tubular member 50 preferably formed of glass clamped between the end members 51 and 52 by means of the bolts 53, the trunnion 48 being formed on the end 51 and a trunnion 54 being formed on the end 52 and both of said trunnions being journaled in a bracket 55 adapted to be secured to the vehicle in any suitable manner and at any convenient location.

The surface of the cylinder 50 is preferably silvered as shown at 56, to leave a double set of indicating transparent characters which will be unobserved at a distance from the eye unless illuminated by a light within the cylinder. The indicating characters are preferably formed in indents in the peripheral surface of tubular member 50 and comprise the words Stop disposed opposite each other at 58 and 59, one of which being normally in line with the eye of an observer from the front and the other in line with the observer's eye from the rear, the oppositely disposed arrows 60 and 61 pointing to the right and the oppositely disposed arrows 62 and 63 pointing to the left, said arrows being adapted to be brought into register with the observer's eye upon a one-sixth movement of the cylinder.

The cylinder 50 is adapted to be held in normal position, as shown, by means of the springs 64 and to be illuminated when desired by means of the electric lamp 65 which is secured in the end 51 as clearly shown in Fig. 3, said lamp being included in the circuit formed by the wires 43, 44, and the battery 66 and which is held normally open by the switch operated by lever 25, and may also be included in a circuit adapted to be closed by means of the foot brake lever 67 of the automobile.

In the operation of the device it will be obvious that when the vehicle is stopped when directed straight ahead, upon an application of the foot brake 67 the circuit will be closed, thereby illuminating the cylinder and displaying the stop signal both in front and at the rear. If the operator intends to turn to the right he moves the lever 26 to the right as shown in dotted lines, by first pulling outwardly thereon against the tension of the spring 36. As the lever 26 is thus moved the cylinder 50 will be correspondingly moved to bring the arrows 60 and 61 into register with the observer's eye and at the same time the switch will be operated to make an electrical connection to illuminate the cylinder. By moving the lever 26 in the opposite direction from normal the left signal may be given in a similar manner.

When the lever 26 is moved to display the right signal as shown in dotted lines in Fig. 2, the tooth 38 rests on the peripheral surface of the ring 31 and is held pressed against said surface by means of the spring 68 secured to the housing wall 23, as well as one of the springs 64. Upon a movement of the steering wheel to the left to guide the vehicle in a straight forward direction, the tooth 38 becomes engaged in the notch 33 and as a consequence the lever 26 is again brought back to a neutral position. The same action takes place when it is desired to give the left turn signal.

What I claim is:

1. In combination with a motor vehicle provided with a rotatable signal indicating mechanism, of a signal operating mechanism connected to the steering column of the vehicle, said mechanism comprising a manually operated lever having a toothed inner end, a flexible shaft connected to said lever and to said rotatable signal device for rotating said device on an actuation of said lever, and a notched collar mounted on the vehicle steering wheel column and movable therewith, the notches of said collar engaging the toothed end of said shifting lever to automatically return the same to a normal position after a shifting movement.

2. The combination with a motor vehicle provided with a rotatable signal indicating mechanism, of a signal operating mechanism comprising a lever movably secured to the steering column of the vehicle and connected to the rotatable signal for rotating the same, said lever being provided on its inner end with a pair of toothed members, and a collar secured to the steering wheel of the vehicle and movable therewith, said collar being provided with notches adapted to engage the toothed member of the lever to automatically return the same to a normal position on a partial rotation of said collar.

In witness that I claim the foregoing I have hereunto subscribed my name this 24th day of March, 1922.

WALTER J. SAVIERS.